United States Patent [19]

Koch et al.

[11] Patent Number: 5,208,278

[45] Date of Patent: May 4, 1993

[54] STABILIZED POLYARYL ETHER KETONE MOLDING COMPOSITIONS

[75] Inventors: Juergen Koch, Neuhofen; Gerhard Heinz, Weisenheim, both of Fed. Rep. of Germany

[73] Assignee: BASF Aktiengesellschaft, Ludwigshafen, Fed. Rep. of Germany

[21] Appl. No.: 677,336

[22] Filed: Mar. 29, 1991

[30] Foreign Application Priority Data

Mar. 30, 1990 [DE] Fed. Rep. of Germany ....... 4010188

[51] Int. Cl.[5] .......................... C08K 5/45; C08K 5/34; C08K 5/48
[52] U.S. Cl. ......................................... 524/83; 524/84; 524/87; 524/92; 524/94; 524/99
[58] Field of Search ................... 524/83, 84, 87, 92, 524/94, 99

[56] References Cited

U.S. PATENT DOCUMENTS

| | | | |
|---|---|---|---|
| 4,024,155 | 5/1977 | Pigerol et al. | 524/94 |
| 4,897,307 | 1/1990 | Beck et al. | 524/84 |
| 4,954,604 | 9/1990 | Genz et al. | 528/126 |
| 4,954,605 | 9/1990 | Deeg | 528/126 |
| 4,990,589 | 2/1991 | Towle et al. | 528/126 |
| 4,994,511 | 2/1991 | Kluttz | 524/99 |

Primary Examiner—Kriellion S. Morgan
Attorney, Agent, or Firm—Oblon, Spivak, McClelland, Maier & Neustadt

[57] ABSTRACT

Stabilized polyaryl ether ketone molding compositions containing as essential components A) from 50 to 99.99% by weight of a polyaryl ether ketone prepared by electrophilic polycondensation and composed to an extent of not less than 50 mol % of units of the formula I'

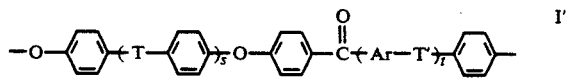

where s and t are each 0, 1, 2 or 3, T and T' are each —O— or —CO— and Ar is meta-phenylene, paraphenylene or two aromatic rings linked to each other in the meta or para position by a chemical bond, or the ring-substituted $C_1$–$C_8$-alkyl, $C_6$–$C_{20}$-aryl or halogen derivatives thereof, B) from 0.01 to 4% by weight of at least one organic compound which has a base constant $pk_b$ within the range from 2 to 12 and a boiling point of higher than 300° C., C) from 0 to 50% by weight of a further thermoplastic other than A), and D) from 0 to 45% by weight of fibrous or particulate fillers or mixtures thereof.

7 Claims, No Drawings

STABILIZED POLYARYL ETHER KETONE MOLDING COMPOSITIONS

The present invention relates to stabilized polyaryl ether ketone molding compositions containing as essential components A) from 50 to 99.99% by weight of a polyaryl ether ketone prepared by electrophilic polycondensation and composed to an extent of not less than 50 mol % of units of the formula I'

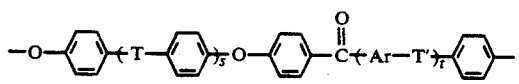

where s and t are each 0, 1, 2 or 3, T and T' are each —O— or —CO— and Ar is meta-phenylene, paraphenylene or two aromatic rings linked to each other in the meta or para position by a chemical bond, or the ring-substituted $C_1$–$C_8$-alkyl, $C_6$–$C_{20}$-aryl or halogen derivatives thereof, B) from 0.01 to 4% by weight of at least one organic compound which has a base constant $pk_b$ within the range from 2 to 12 and a boiling point of higher than 300° C., C) from 0 to 50% by weight of a further thermoplastic other than A), and D) from 0 to 45% by weight of fibrous or particulate fillers or mixtures thereof.

The present invention further relates to the use of such stabilized polyaryl ether ketone molding compositions for producing fibers, films and moldings and to fibers, films and moldings which contain these polyaryl ether ketone molding compositions as essential components.

Polyaryl ether ketone molding compositions are high grade thermoplastics which are notable for a particularly high heat resistance, high toughness, very good mechanical properties and resistance to common solvents.

Polyaryl ether ketones can be prepared by two different processes known per se. In the so-called nucleophilic polycondensation process an oxygen linkage is formed by reacting for example aromatic dihydroxy compounds with difluoroketones with base catalysis. Such a process is described for example in EP-A-1879.

A second way of preparing polyaryl ether ketones is by electrophilic (Friedel-Crafts) polycondensation. It involves forming the carbonyl linkage either by reacting an aromatic dicarbonyl dichloride or phosgene with an aromatic containing two hydrogen atoms which are replaceable by electrophilic substitution, or polycondensing an aromatic carbonyl chloride containing not only an acid chloride group but also a replaceable hydrogen atom with itself.

Friedel-Crafts reactions are customarily carried out in the presence of a Lewis acid as catalyst in solution, as described for example in U.S. Pat. Nos. 3,441,538, 3,442,857, 3,953,400, DE-A-3,241,444, DE-A-34 16 445 and DE-A-34 16 446. Reaction in the presence of a Lewis acid and a Lewis base is likewise possible and is described for example in EP-A-124 276.

The polyether ketones prepared by electrophilic polycondensation can be substantially decontaminated of the acids present by extraction with a suitable solvent, but traces of acid will remain behind in the polymer.

When polyaryl ether ketone molding compositions are processed in the melt, temperatures of 400° C., preferably even 450° C., are reached. At these very high temperatures even small traces of acid can damage the polymer. For this reason it was proposed in DE-A-24 19 044 that amphoteric metal oxides be added to the polymer. Owing to their basic properties, they are capable of binding or neutralizing the trace acid. EP-A-197 727 proposes using molecular sieves for the same purpose. However, these stabilizers both have the disadvantage that they do not become homogeneously dispersed in the polymer and may even aggregate together to form large particles. In the manufacture of very fine fibers or films, therefore, these additives can lead to considerable processing problems. Being infusible substances, they may in addition have an effect on the crystallization characteristics of partly crystalline polymers. Moreover, the metal oxides and molecular sieves in question gradually tend to absorb water which is not given off again at the drying temperatures customary for polymers. But at the significantly higher processing temperatures water may then be released and cause foaming of the polymer.

It is an object of the present invention to remedy the aforementioned defects.

We have found that this object is achieved by the stabilized polyaryl ether ketone molding compositions defined at the beginning. We have also found them to be useful for producing fibers, films and moldings.

The polyaryl ether ketones utilized as component A) are at least 50 mol % units of the formula I'

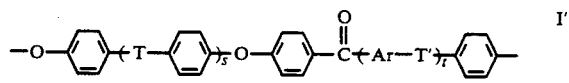

where s and t are each 0, 1, 2 or 3, T and T' are each oxygen or carbonyl and Ar is meta-phenylene, paraphenylene or two aromatic rings linked to each other in the meta or para position by a chemical bond and in particular is 4,4'-biphenylene. In principle, the aromatic units of the polyaryl ether ketones I' can be substituted by $C_1$–$C_8$-alkyl, $C_6$–$C_{20}$-aryl or halogen. In general, however, the unsubstituted derivatives are preferred.

Units of the formula I

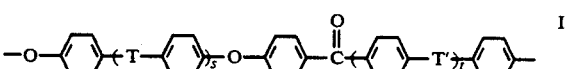

should be mentioned in particular. Examples of particularly preferred units of the formula I are:

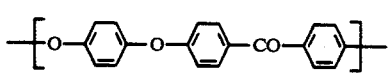

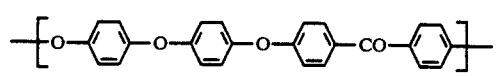

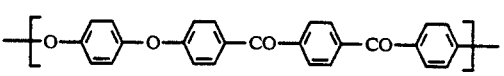

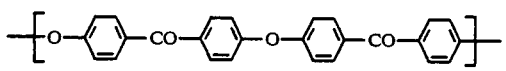

and in particular

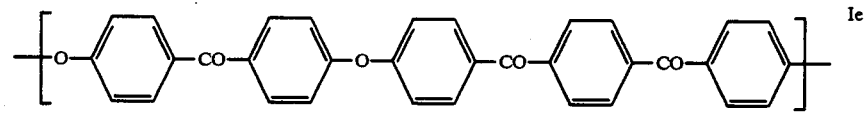

In terms of the substituents T and T' and the parameters s and t the foregoing examples may be described as follows:

|    | s | t | T  | T' |
|----|---|---|----|----|
| Ia | 0 | 0 | —  | —  |
| Ib | 1 | 0 | 0  | —  |
| Ic | 0 | 1 | —  | CO |
| Id | 1 | 0 | CO | —  |
| Ie | 1 | 1 | CO | CO |

Component A) is used in amounts of from 50 to 99.99% by weight, based on the total weight of the molding composition, preferably from 60 to 99.99% by weight, in particular from 70 to 99.99% by weight.

The polyaryl ether ketones are prepared by electrophilic polycondensation; the customary conditions known to those skilled in the art are employed. If the starting materials used are aromatic dicarbonyl dichlorides and aromatics with two replaceable hydrogen atoms, suitable possibilities are for example terephthaloyl dichloride, 4,4'-biphenyldicarbonyl dichloride, diphenyl ether, 1,4-diphenoxybenzene and 4,4'-diphenoxybenzophenone. An example of a self-condensable monomer is 4-phenoxybenzoyl chloride.

The component B) used as a stabilizer has a base constant $pk_b$ of from 2 to 12, preferably from 3 to 11, and a boiling point of higher than 300° C., preferably within the range from 320° to 500° C. Examples of suitable compounds are 2,3-bipyridine, 4-benzoylpyridine, 2,6-diphenylpyridine, 2,6-bis(benzoylphenyl)pyridine, 2,6-bis(4-benzoylphenoxy)pyridine, 2,2',6,2''-terpyridine, phenazine, 3,4-benzoquinoline, 7,8-benzoquinoline, 2-phenylquinoline, 2-phenylindole, 1-methyl-2-phenylindole, 1,2-diphenylindole, 9-phenylcarbazole, dibenzothiophene and thioxanthone, of which 4-benzoylpyridine, 9-phenylcarbazole and 2-phenylindole are preferred. Mixtures of these compounds may also be used.

Component B) is used in amounts of from 0.01 to 4% by weight, preferably from 0.1 to 1% by weight.

In addition, further thermoplastics C) which are different from A) can be mixed in. Suitable for this purpose are in particular polyaryl ether sulfones and copolymers thereof, polyether imides, polyamide imides, polyimides, aromatic polyesters, polyphenylene sulfides, fluoropolymers and aliphatic or aromatic polyamides. Appropriate products would be known to those skilled in the art and are commercially available.

These polymers may be added in amounts of from 0 to 50% by weight, preferably from 5 to 30% by weight.

In addition the stabilized polyaryl ether ketone molding compositions according to the present invention may contain as component D) fibrous or particulate fillers and also mixtures thereof in amounts of from 0 to 45% by weight, in particular from 5 to 40% by weight. Suitable reinforcing fillers are for example asbestos or fibers of aramid, glass or carbon, which may be used not only as short fibers but also as endless fibers. It is also possible to admix pigments such as titanium dioxide, cadmium sulfite, zinc sulfite, barium sulfate and carbon black. Other suitable additives and auxiliaries are for example flame retardants, further stabilizers other than B), and customary processing aids.

To prepare the stabilized polyaryl ether ketone molding compositions according to the present invention, components A) and B) and, if used, C) and D) can be reacted in a mixing apparatus, preferably in an extruder, at a housing temperature of from 350° to 450° C., preferably from 390° to 420° C. Component B) is stable to customary mixing conditions and residence times. Preferably, the extrudate is in the form of a strand which is granulated.

The stabilized polyaryl ether ketone molding compositions according to the present invention are significantly more stable in the melt than nonstabilized molding compositions. The stabilizers described form homogeneous solutions in the polymers, do not tend to aggregate and therefore do not cause any processing problems in the manufacture of very fine fibers or films. The stabilized polyaryl ether ketone molding compositions are therefore suitable in particular for manufacturing fibers, films and moldings.

EXAMPLES

Preparation of Polyaryl Ether Ketone

The method described in Example 13 of EP-A-124 276 was used to prepare a polyaryl ether ketone of structure Ie

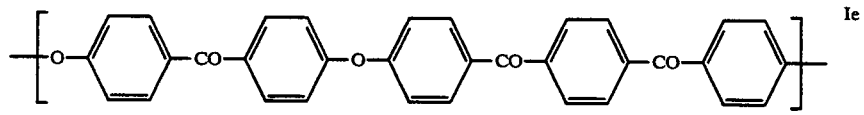

having an inherent viscosity of 0.997 (measured in a solution of 0.5 g/100 ml of concentrated sulfuric acid at 25° C.).

EXAMPLES 1 to 5

Preparation of Stabilized Polyaryl Ether Ketone Molding Compositions

The polyaryl ether ketone was in each case intensively mixed with 0.5% by weight of stabilizer, and the mixture was extruded from an extruder at a housing temperature of 400° C. in strand form and granulated.

COMPARATIVE EXAMPLES CE1 TO CE3

CE1: The polyaryl ether ketone was extruded and granulated as in Examples 1 to 5 without addition of a stabilizer.

CE2: The procedure was the same as in Examples 1 to 5, except that 0.5% by weight of commercial basic molecular sieve was incorporated.

CE3: The procedure was the same as in Examples 1 to 5, except that 0.5% by weight of a basic aluminum oxide was incorporated.

Each granular product obtained was tested for melt stability. The test took the form of a determination of the melt volume index (MVI) by the method designated DIN 53 735-MFI-B using a type MP-D instrument from Göttfert at 400° C. under a load of 10 kg. Each sample was subjected to three measurements following a heating-up time of 5, 30 and 60 minutes. The results of the melt flow index measurements are summarized in the table.

TABLE

| | | MVI [ccm/10 min] | | |
|---|---|---|---|---|
| Example | Stabilizer | 5 min | 30 min | 60 min |
| 1 | 4-benzoylpyridine | 55.2 | 53.9 | 48.3 |
| 2 | 7,8-benzoquinoline | 57.6 | 46.8 | 38.9 |
| 3 | 9-phenylcarbazole | 59.5 | 59.6 | 46.8 |
| 4 | 2-phenylindole | 63.9 | 59.7 | 46.4 |
| 5 | 1-methyl-2-phenylindole | 64.4 | 62.8 | 45.3 |
| CE1 | — | 51.8 | 42.8 | 32.1 |
| CE2* | Molecular sieve (basic) | 60.3 | 56.3 | 45.1 |
| CE3* | Aluminum oxide (basic) | 49.7 | 48.8 | 46.1 |

*When trying to produce fibers from the polymer by melt spinning, a solid material was found to build up at the spinneret plate, causing filament breakage from time to time. After about 1 hour a melt filter installed in the melt duct had become blinded.

We claim:

1. A stabilized polyaryl ether ketone molding composition containing as essential components
   A) from 50 to 99.99% by weight of a Lewis acid containing polyaryl ether ketone prepared by electrophilic polycondensation and composed to an extent of not less than 50 mol % of units for the formula I'

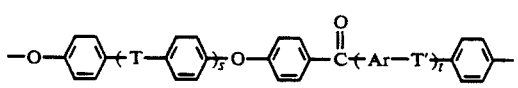

where s and t are each 0, 1, 2 or 3, T and T' are each —O— or —CO— and Ar is meta-phenylene, paraphenylene or two aromatic rings linked to each other in the meta or para position by a chemical bond, or the ring-substituted $C_1$-$C_8$-alkyl, $C_6$-$C_{20}$-aryl or halogen derivatives thereof,
   B) from 0.01 to 4% by weight of at least one organic compound which has a base constant $pk_b$ within the range from 2 to 12 and a boiling point of higher than 300° C.,
   C) from 0 to 50% by weight of a further thermoplastic other than A), and
   D) from 0 to 45% by weight of fibrous or particulate fillers or mixtures thereof.

2. A stabilized polyaryl ether ketone molding composition as claimed in claim 1, in which component A) comprises a polyaryl ether ketone of a unit I

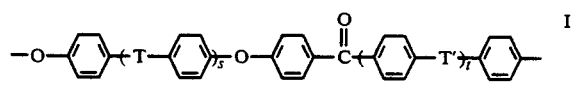

3. A stabilized polyaryl ether ketone molding composition as claimed in claim 1, containing component B) in an amount of from 0.1 to 1% by weight.

4. A stabilized polyaryl ether ketone molding composition as claimed in claim 1, wherein component B) is selected from the group consisting of 2,3-bipyridine, 4-benzoylpyridine, 2,6-diphenylpyridine, 2,6-bis(benzoylphenyl)pyridine, 2,6-bis(4-benzoylphenoxy)pyridine, 2,2',6,2''-terpyridine, phenazine, 3,4-benzoquinoline, 7,8-benzoquinoline, 2-phenylquinoline, 2-phenylindole, 1-methyl-2-phenylindole, 1,2-diphenylindole, 9-phenylcarbazole, dibenzothiophene, thioxanthone and mixtures thereof.

5. A stabilized polyaryl ether ketone molding composition as claimed in claim 1, wherein component A) comprises a polyaryl ether ketone of a unit Ie

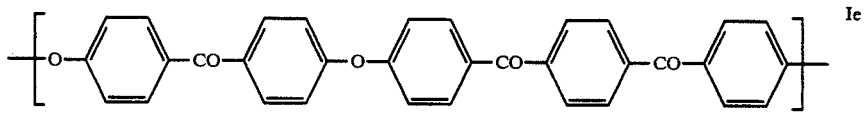

6. A fiber, film or molding obtainable from the stabilized polyaryl ether ketone molding composition as claimed in claim 1 as an essential component.

7. A process for stabilizing a polyaryl ether ketone molding composition containing as essential components
   A) from 50 to 99.99% by weight of an acid containing polyaryl ether ketone prepared by electrophilic polycondensation and composed to an extent of not less than 50 mol % of units for the formula I'

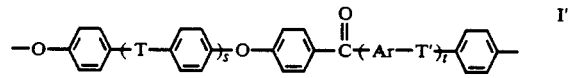

where s and t are each 0, 1, 2 or 3, T and T' are each —O— or —CO— and Ar is meta-phenylene, paraphenylene or two aromatic rings linked to each other in the meta or para position by a chemical bond, or the ring-substituted $C_1$-$C_8$-alkyl, $C_6$-$C_{20}$-aryl or halogen derivatives thereof,
   B) from 0 to 50% by weight of a further thermoplastic other than A), and
   C) from 0 to 45% by weight of fibrous or particulate fillers or mixtures thereof,
comprising neutralizing the acid by adding during the extrudation from 0.01 to 4% by weight of at least one organic compound which has a base constant $pk_b$ within the range from 2 to 12 and a boiling point of higher than 300° C.

* * * * *